United States Patent [19]

Heflinger

[11] 3,743,418

[45] July 3, 1973

[54] CONTOUR MAPPING SYSTEM

[75] Inventor: Lee O. Heflinger, Torrance, Calif.

[73] Assignee: TRW Inc., Redondo Beach, Calif.

[22] Filed: Dec. 7, 1970

[21] Appl. No.: 95,808

[52] U.S. Cl..................... 356/5, 356/4, 331/94.5 A
[51] Int. Cl............................................... G01c 3/08
[58] Field of Search............................. 356/3, 4, 5; 332/7.51; 330/4.3; 331/94.5 A

[56] References Cited
UNITED STATES PATENTS

| | | | |
|---|---|---|---|
| 3,682,553 | 8/1972 | Kapany | 356/5 |
| 3,669,541 | 6/1972 | Duguay | 356/5 |
| 3,446,555 | 5/1969 | Kahn | 356/5 |
| 3,380,358 | 4/1968 | Neumann | 356/5 |
| 3,414,728 | 12/1968 | Patel | 332/7.51 |

Primary Examiner—Benjamin A. Borchelt
Assistant Examiner—S. C. Buczinski
Attorney—Daniel T. Anderson, Edwin A. Oser and Jerry A. Dinardo

[57] ABSTRACT

A system for creating a topographical map of a terrain. The terrain is periodically illuminated by high-intensity light pulses. The light reflected by the terrain is gated in synchronism with the transmitted pulses. Accordingly, certain elevated areas will return light pulse echos which are gated out at the receiver so that dark contour lines appear on the map of the terrain. The light pulses may be generated by passing continuous light through an electronic shutter which may consist of a Pockels or Kerr cell followed by a light polarization selective element which passes light only of a certain plane of polarization. Alternatively, a mode-locked laser may be used as a light source. The light at the receiver may be similarly gated by an electronic shutter, such as a gated image converter or a Kerr cell, used in conjunction with polarizers.

2 Claims, 6 Drawing Figures

Lee O. Heflinger
INVENTOR.

Lee O. Heflinger
INVENTOR.

CONTOUR MAPPING SYSTEM

BACKGROUND OF THE INVENTION

This invention relates generally to a system for measuring distance, range, or altitude, and particularly relates to a mapping system which makes use of gated light pulses for generating a topographical or contour map.

Various schemes have been devised in the past for generating maps from airborne vehicles such as airplanes. This has, for example, been effected by radar systems. Such a system is a side-looking radar which is relatively complex and requires expensive equipment.

It has also been suggested to provide topographical information by means of a light pulse which is used to illuminate the area of the terrain to be mapped. Such a system has been disclosed in the U. S. Pat. to Hook and Dishington, No. 3,527,533, assigned to the assignee of the present application. However, the Hook et al. system has the disadvantage that a very high light intensity is required for each of the mapping pulses. The reason is that the light intensity must be large so that the single return pulse may be analyzed to obtain the data necessary to construct a map of the terrain illuminated.

It is accordingly an object of the present invention to provide an improved contour mapping system which makes use of light pulses which do not require the high light intensity of prior systems.

A further object of the present invention is to provide an improved system for making a topographic map, for example, from a vehicle moving over the terrain to be mapped, the system being relatively simple, inexpensive, and reliable.

Another object of the present invention is to provide a contour mapping system of the type discussed which does not require coherent light of the type generated by a laser, but simply relies on a high-intensity light source capable of generating very short light pulses.

SUMMARY OF THE INVENTION

A contour mapping system, in accordance with the present invention, comprises a suitable light source for generating a light beam. This light source need not be a laser because there is no need to utilize monochromatic light. However, in some cases, a laser may be preferred for the sole reason that it is capable of issuing intensive light pulses. Means are associated with the light source for generating periodic pulses of light and directing them toward an area to be mapped. Thus, there may be provided an electronic shutter for periodically interrupting a continuous light beam or for periodically interrupting a relatively long pulse of light. Alternatively. a light source may be used which is capable of generating periodic light pulses. An example of such is a laser, either of the pulsed or steady state type.

The light pulses reflected by the area to be mapped are focused by suitable means such as, for example, a lens. Finally an electronic shutter is interposed in the path of the focused and reflected light pulses. The shutter permits light pulses reflected from the illuminated area to be passed in synchronism with the light pulses initially transmitted. As a result, the reflected light pulses will create a contour map of the area illuminated. This is so because light reflected by the terrain, which has a round trip time such that this light arrives at the receiver when the electronic shutter is closed, is excluded so that dark areas appear on the map to indicate contour lines. Similarly, light reflected from this terrain which has a round trip time such that it arrives when the shutter is open provides the bright portion of the image between the dark contour lines.

A method of preparing a topographical map of a terrain to be mapped may comprise the steps of generating intensive light pulses at a periodic and constant rate. These light pulses are directed toward the terrain to be mapped. The light pulses reflected by the terrain are received in the vicinity of the origin of the light pulse. Finally, the received light pulses are gated in synchronism with the transmitted light pulses. Thus, an image of the terrain may be viewed having dark contour lines corresponding to elevational areas having a round trip time such that the returning light pulses are not received.

The novel features that are considered characteristic of this invention are set forth with particularity in the appended claims. The invention itself, however, both as to its organization and method of operation as well as additional objects and advantages thereof, will best be understood from the following description when read in connection with the accompanying drawings.

DESCRIPTION OF THE PREFERRED EMBODIMENTS

Figure 1:
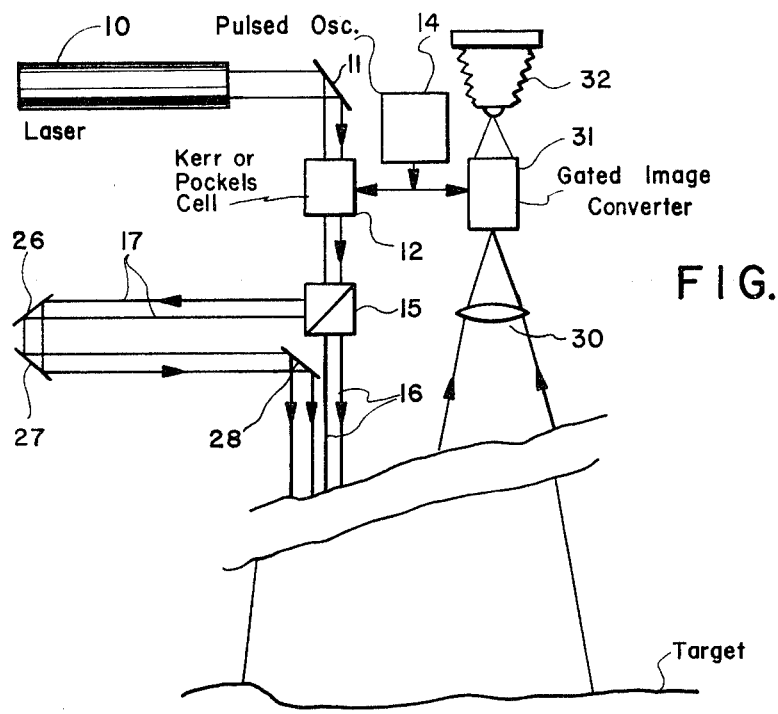
FIG. 1 is a schematic view of an optical system for providing contour maps in accordance with the present invention.

Referring now to the drawings, and particularly to FIG. 1, there is illustrated a contour mapping system in accordance with the present invention. The mapping system includes a suitable light source 10 which may be a laser, as shown. However, as pointed out before, there is no necessity to use coherent light. A laser 10 may simply be preferred because it generates a high-intensity light beam. The light beam of the source 10 should be sufficiently collimated to permit proper operation of the shutter of the receiver. Thus, the light beam of the laser 10 may be deflected by a mirror 11 into a suitable electro-optical device 12. This may consist of a Kerr cell or a Pockels cell, as shown. The electro-optical device 12 may be controlled by a pulsed oscillator 14 so as to energize electro-optical element 12 in a periodic fashion. The element 12 will then periodically shift the plane of polarization of the light beam passing therethrough. The light beam is then made to impinge on a light polarization selective element 15 which has the property of transmitting a light beam 16 when the incoming light beam has a predetermined direction of polarization. For light having a different direction of polarization, the light is deflected to provide the light beam 17 of FIG. 1.

Figure 2:
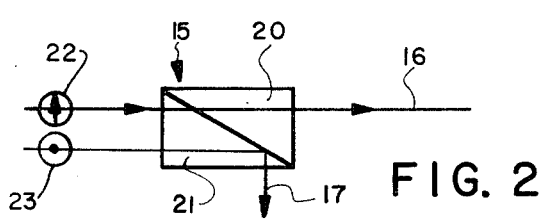
FIG. 2 is a schematic view of a birefringent optical element, such as a calcite prism, forming part of the electronic shutter of the system of FIG. 1.

The construction of one such polarization selective element 15 will now be explained by reference to FIG. 2. The element 15 may consist of two calcite prisms 20 and 21 having a common interface. Light which is polarized vertically, as shown at 22, is passed through the two prisms 20 and 21, and emerges as a light beam 16. Light which is polarized at right angles to the plane of the paper, as shown at 23, is deflected by total inernal reflection at the boundary or interface between the two prisms 20 and 21, and emerges as a deflected light beam 17. However, it will be understood that birefringent materials other than calcite may be used as the birefringent optical element 15.

Figure 3:
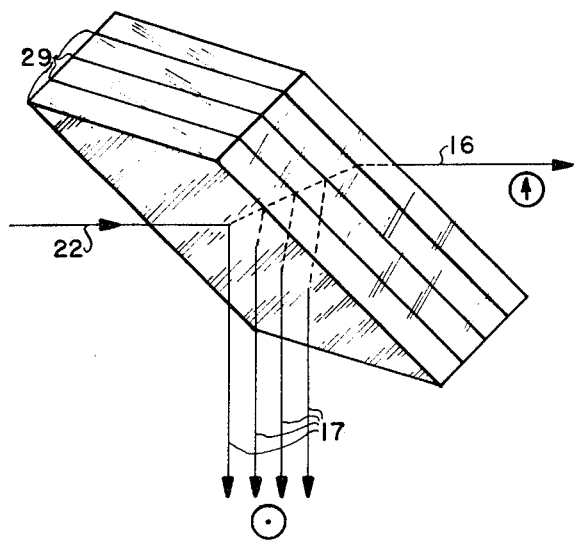
FIG. 3 is a schematic view of another light polarization selective element which may be used with the electronic shutter of FIG. 1.

Another form of the polarization selective element 15 is shown in FIG. 3 to which reference is now made. This consists simply of a stack of glass plates 29 disposed at the Brewster angle. The stack of glass plates 29 passes light having one plane of polarization. Thus, the incoming light beam 22 is passed as the light beam 16 and this light is vertically polarized as shown. Most of the remainder of the light is reflected, including light which is polarized at right angles to the plane of the paper as shown. This will produce the outgoing light beam 17.

Figure 4:
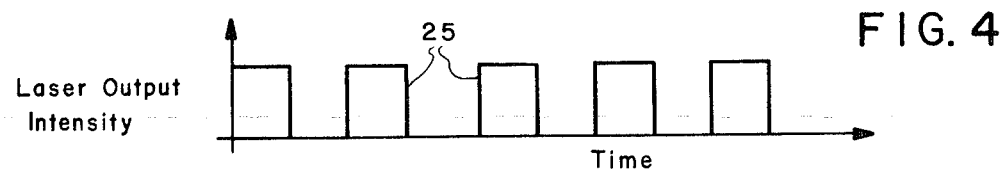
FIG. 4 is a graph showing the output intensity of the light source of FIG. 1 as a function of time.

It will now be understood that the electro-optic device 12 and the polarization selective element 15 jointly form an electronic shutter well-known in the art. This shutter creates light pulses of the type shown at 25 in FIG. 4. As shown in FIG. 4, the light pulses 25 may have, for example, a duration substantially equal to the dark period between successive transmitted light pulses.

Another variation of the pulse shape of the transmitted pulses is obtained by applying a sine wave voltage to the Kerr cell 12. This will generate sinusoidal light pulses. Such a pulse wave shape is particularly convenient because the Kerr cell 12 may be made excited by an electronically resonant structure forming part of the pulsed oscillator 14 which makes it easy to drive the Kerr cell electrically.

The light beam 16 now serves the purpose to illuminate the target illustrated in FIG. 1. If desired, the light beam 17 may be added to the light beam 16 by means of a system of mirrors 26, 27, and 28. The mirrors 26, 27, and 28 should be so spaced as to provide a predetermined time delay. As a result, the time delayed light pulse corresponding to the beam 17 should be delayed and timed so that it will coincide with the next light pulse of the light beam 16 so that substantially no light is being lost. However, it is not essential for the operation of the system of the invention that the light beam 17 be added to the light beam 16. In this case, the mirrors 26 to 28 may be omitted.

The light echo pulses returned from the target may now be collected by a suitable focusing means such as a lens 30. The reflected and focused light may then be passed through a suitable electronic shutter 31. Preferably, the electronic shutter 31 consists of a gated image converter which will also amplify the received light in the conventional fashion of an image converter tube. A suitable image converter tube has been disclosed in U. S. Pat. No. 3,292,031 to Hickey, while a suitable circuit for operating such a tube has been disclosed in U. S. Pat. No. 3,164,778 to Clark et al., both patents being assigned to the assignee of the present application. However, it will be understood that other image converter tubes and other circuits may be used instead. It is also feasible to use a Kerr cell shutter of the type used in Kerr cell high-speed cameras.

In any case, the gated image converter tube 31 is also controlled by the pulsed oscillator 14 so that the transmitted and received pulses are gated in synchronism. The image created by the image converter tube 31 may be viewed directly by the observer. Alternatively, a camera 32 may be provided for recording the image obtained from the image converter tube. This, of course, has the advantage that the light of many returned pulses may be integrated by the photographic plate.

The contour mapping system of the invention may be carried by a suitable airborne vehicle such as an airplane; or alternatively, the terrain may be mapped from a high mountain or even a high tower.

When the period of the light pulses is two nanoseconds, the contour interval will be very close to one foot. Therefore, depending on the details of the map desired, the light pulses should be gated or should have a pulse repetition period on the order of nanoseconds or less. This, of course, is the reason why an electronic shutter in both the transmitter and receiver is preferred. In general, mechanical shutters cannot be made to operate on the order of nanoseconds.

It should also be realized that the contour lines appear only in the film of the camera 32 or in the retina of the observer. These dark contour lines are caused by the fact that light pulses reflected from a certain elevation have such a round trip that they are not passed by the image converter 31; that is, they are gated out. Thus, the dark contour lines correspond to the situation where the gate is closed for light pulses having a certain round trip time. Light pulses from other ranges are received and create a light contour map.

Figure 5:
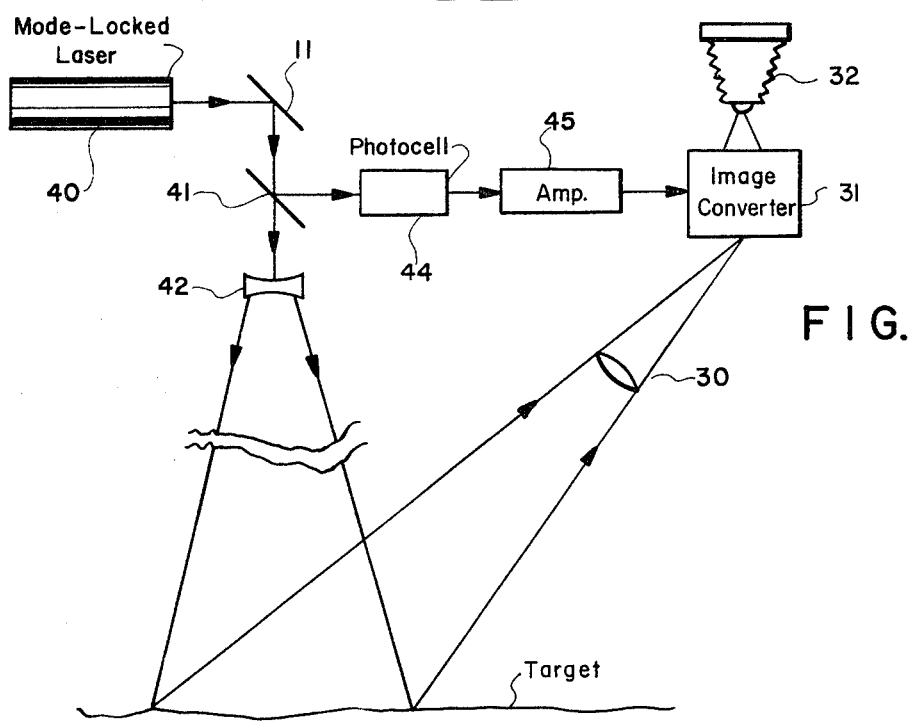
FIG. 5 is a schematic view of a modified contour mapping system in accordance with the present invention.

Another embodiment of the contour mapping system of the present invention is illustrated in FIG. 5, to which reference is now made. This includes a mode-locked laser 40 which will automatically generate the desired light pulses. Such a mode-locked laser may be, for example, a ruby laser. Included in the laser cavity may be a suitable dye such as 1,1-diethyl-2,2'-dicarbocyanine iodide (DDI). This will automatically mode-lock the laser beam because only an intense light pulse reflected within the laser cavity will be capable of bleaching the dye cell which normally absorbes the laser light. Instead of a ruby laser, a neodymium laser may be used where the neodymium is embedded in a hose material such as glass or yttrium aluminum garnet (YAG). It is also possible to mode-lock a laser in any other conventional manner; for example, by means of an acoustic cell, which also periodically varies the Q of the cavity. A conventional Q-switched laser with any mode-locking arrangement may also be used.

The light pulses issued by the mode-locked laser 40 may be deflected by a mirror 11 and may be passed by a beam splitter 41 onto a diverging lens 42 for diverging the beam to illuminate the target. The return echo pulse may be focused by the lens 30 onto the image converter tube 31.

The image converter tube 31 may be synchronized with the mode-locked pulses generated by the laser 40 through a photocell 44 or other photosensitive device, followed by an amplifier 45. The photocell 44 receives a small fraction of the light pulse generated by the laser 40 through the beam splitter 41. The amlifier 45, in turn, controls the image converter 31. The resulting image may again be viewed either by the eye or photographed by the camera 32.

Figure 6:
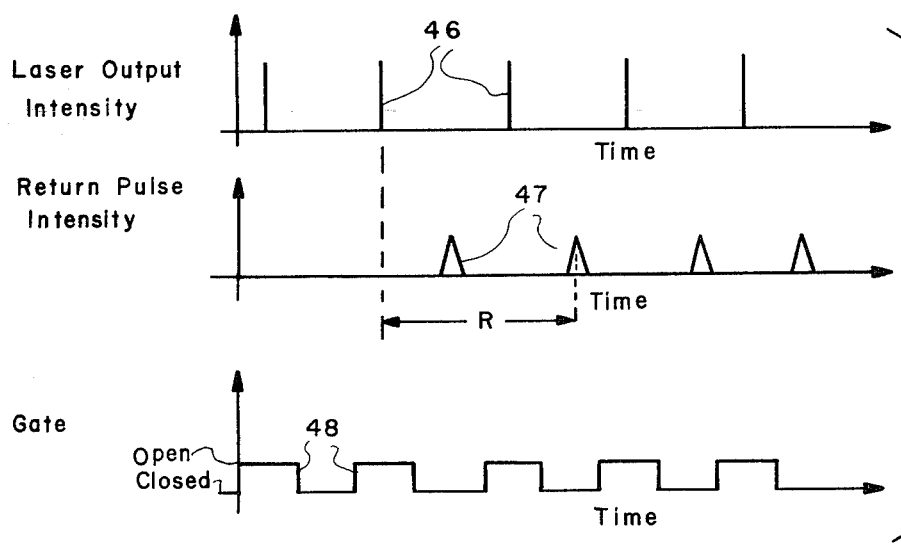
FIG. 6 is a graph showing the laser output intensity, return pulse intensity, and position of the electronic gate at the receiver, all as a function of time.

FIG. 6 illustrates the time relationship of the various pulses of the system of FIG. 5. Thus, pulses 46 illustrate the intensity of the laser output pulses. These are of very short duration as is typical of a mode-locked laser. Certain return pulses have been illustrated at 47, where R indicates the range or elevation which creates the particular return pulses 47. The curve 48 indicates when the gate of the image converter 31 is open or closed. It will thus be seen that the return pulses 47 corresponding to the range R are gated out by the converter tube 31, thus creating a dark contour line. It will, of course, be understood that other return pulses with a different range will be passed by the open gate of the converter tube 31.

It will be appreciated that the contour mapping system of the invention makes it possible to illuminate the same terrain to be mapped with a plurality of pulses so that the light intensity of all return pulses may be integrated either by the human eye or by the film of the camera. Accordingly, it is not necessary to provide the high light intensity required for prior art systems.

There has thus been disclosed a contour mapping system which permits to obtain a topographical map with a minimum of complex equipment and without the use of a very high intensity light source. All that is required is equipment at the transmitter for creating short light pulses, and an electronic shutter at the receiver gated in synchronism with the occurrence of the transmitted light pulses. The transmitter may consist of either a mode-locked laser which will issue the required pulses with high repetition rate, or else an electronic shutter for creating the required pulses from a continuous light beam or a relatively long light pulse.

What is claimed is:

1. The method of preparing a two-dimensional topographical map of a terrain to be mapped which comprises the steps of:
    a. generating intensive light pulses at a periodic and constant rate, the duration of each pulse being substantially equal to the period between two successive pulses;
    b. directing said light pulses toward the terrain to be mapped;
    c. receiving light pulses reflected by the terrain in the vicinity of the pulse generator; and
    d. periodically gating the received light pulses in synchronism with the transmitted light pulses and at a fixed rate, whereby a flat image of the terrain may be viewed having dark contour lines corresponding to elevational areas having a round trip time such that said returning light pulses are not received.

2. The method defined in claim 1 wherein the intensive light pulses are generated by periodically and for equal time intervals shifting the plane of polarization of a continuous light beam, passing light pulses having a first predetermined plane of polarization for directing them toward the terrain to be mapped, deflecting light pulses having the second, different plane of polarization, time delaying the deflected light pulses for a period of time equal to the time duration of a shift of the plane of polarization of the light, and recombining the deflected light pulses with the passed light pulses.

* * * * *